(12) United States Patent
Singh

(10) Patent No.: US 10,048,170 B2
(45) Date of Patent: Aug. 14, 2018

(54) VEHICLE LOADING CONDITION DETECTION SYSTEM AND METHOD

(71) Applicant: The Goodyear Tire & Rubber Company, Akron, OH (US)

(72) Inventor: Kanwar Bharat Singh, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 768 days.

(21) Appl. No.: 14/526,848

(22) Filed: Oct. 29, 2014

(65) Prior Publication Data

US 2016/0121668 A1 May 5, 2016

(51) Int. Cl.
| | | |
|---|---|---|
| G01M 17/02 | (2006.01) | |
| G01L 5/00 | (2006.01) | |
| G01M 17/007 | (2006.01) | |
| B60C 23/04 | (2006.01) | |

(52) U.S. Cl.
CPC ......... G01M 17/02 (2013.01); B60C 23/0408 (2013.01); G01L 5/00 (2013.01); G01M 17/007 (2013.01)

(58) Field of Classification Search
CPC ...................................................... B60C 23/06
See application file for complete search history.

(56) References Cited

U.S. PATENT DOCUMENTS

| | | | | |
|---|---|---|---|---|
| 6,223,108 B1* | 4/2001 | Izawa | ................ | B60G 17/0195 280/5.504 |
| 7,885,750 B2* | 2/2011 | Lu | ....................... | B60T 8/17552 180/197 |
| 7,945,361 B2 | 5/2011 | Brusarosco et al. | | |
| 2003/0046992 A1 | 3/2003 | Caretta | | |
| 2003/0144767 A1 | 7/2003 | Brachert et al. | | |
| 2007/0006652 A1 | 1/2007 | Weldon, Jr. et al. | | |
| 2007/0010928 A1 | 1/2007 | Brusarosco et al. | | |
| 2007/0240501 A1 | 10/2007 | Mancosu et al. | | |
| 2007/0240502 A1 | 10/2007 | Morinaga et al. | | |
| 2009/0062984 A1* | 3/2009 | Poilbout | ............ | B60G 17/0161 701/37 |
| 2011/0199201 A1 | 8/2011 | Brusarosco et al. | | |
| 2011/0231113 A1 | 9/2011 | Brusarosco et al. | | |
| 2013/0211737 A1 | 8/2013 | Batcheller et al. | | |
| 2014/0260585 A1* | 9/2014 | Singh | .................. | B60C 23/0488 73/146.3 |

FOREIGN PATENT DOCUMENTS

| | | |
|---|---|---|
| EP | 1281950 A2 | 2/2003 |
| EP | 2777956 A2 | 9/2014 |
| EP | 2778631 | 9/2014 |

OTHER PUBLICATIONS

EPO Search Report received by Applicant dated Mar. 21, 2016.

* cited by examiner

*Primary Examiner* — Manuel A Rivera Vargas
(74) *Attorney, Agent, or Firm* — Edward T. Kennedy

(57) ABSTRACT

A system and method estimating a vehicle tire load identifies a change in vehicle loading condition by measuring vibration resonant frequency peaks (bounce mode and/or pitch mode) of the unsprung mass. Signals required include the chassis vertical acceleration and/or chassis pitch rate obtained from commercially available sensors mounted to the vehicle. An observer model receives the inertial signal(s) and generates a dynamic load estimation based upon observed frequency change in the sprung mass natural frequency.

7 Claims, 15 Drawing Sheets

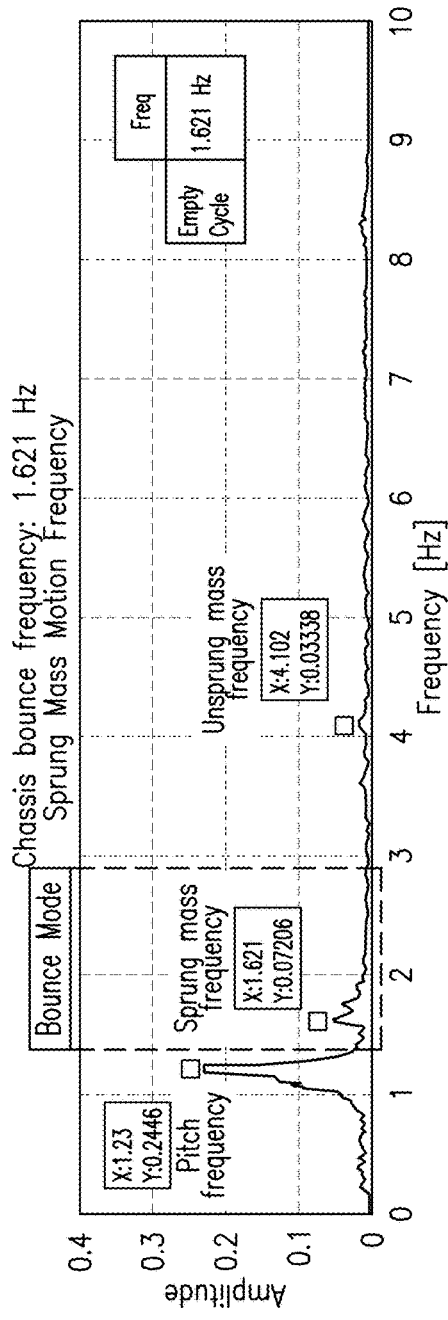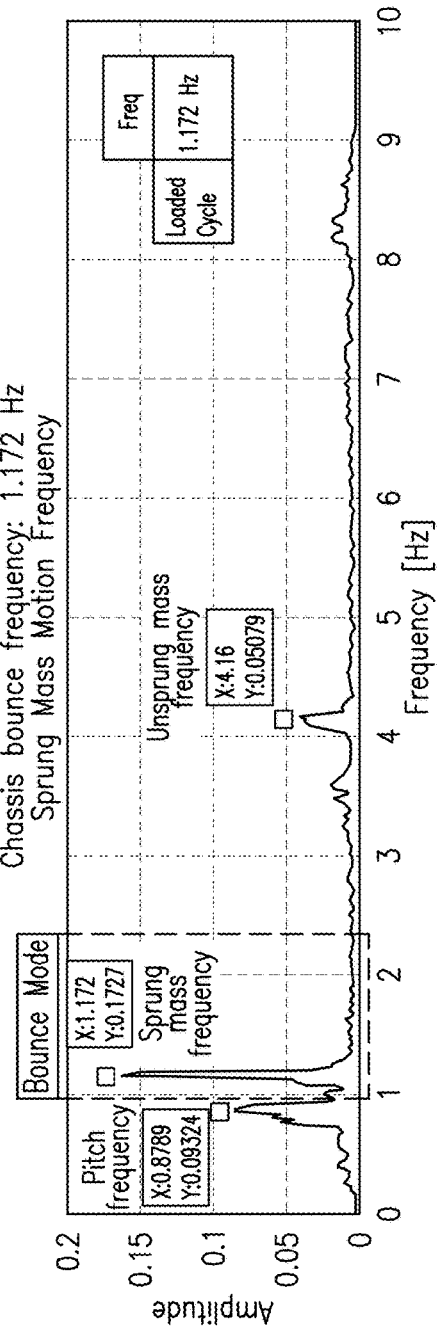
FIG-6A
FIG-6B

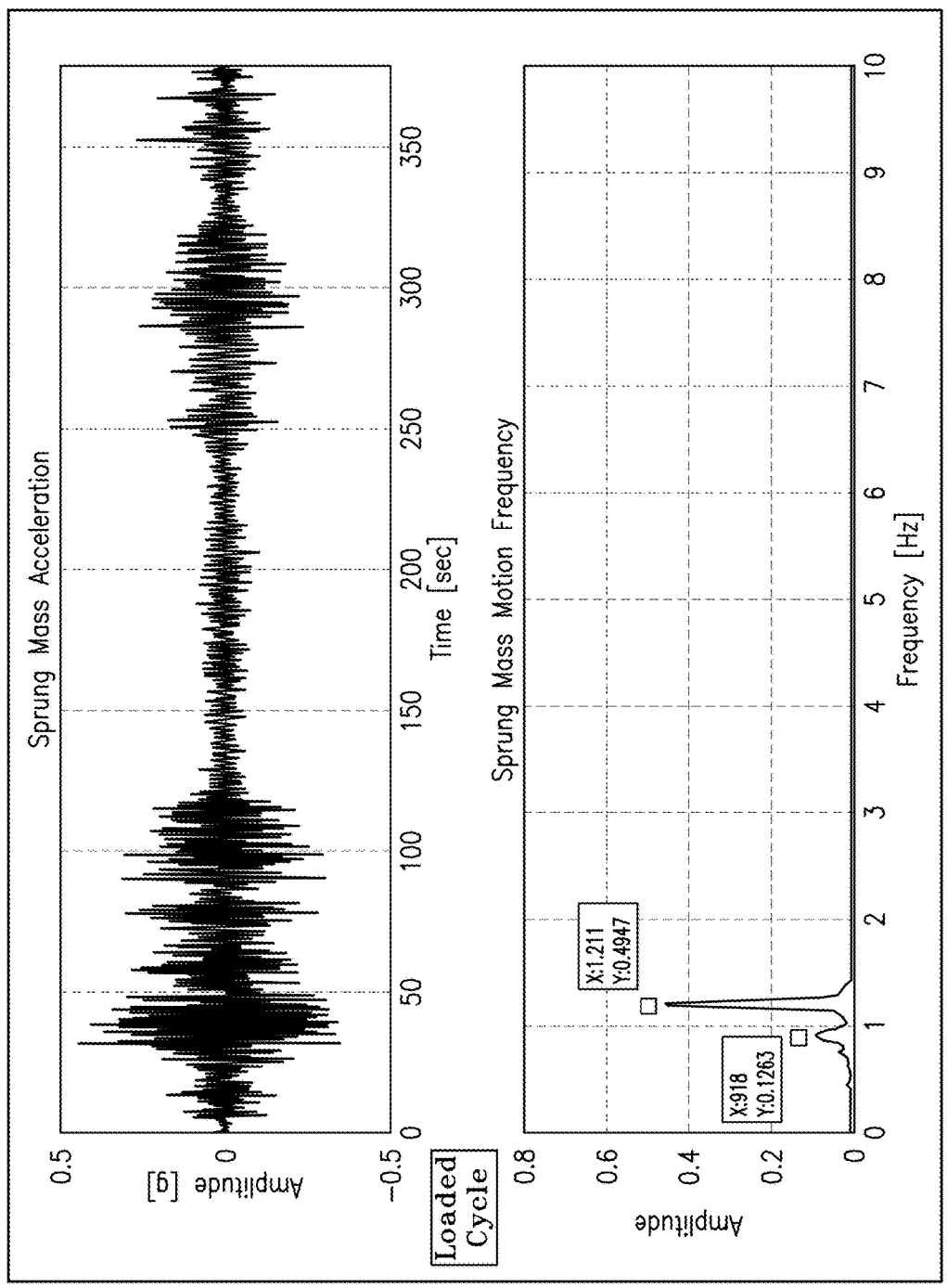

VEHICLE LOADING CONDITION DETECTION SYSTEM AND METHOD

FIELD OF THE INVENTION

The invention relates generally to systems for indirectly estimating a vehicle's loading condition based upon analytic assessment of vehicle operating parameters.

BACKGROUND OF THE INVENTION

The loading condition of a vehicle may be measured by various techniques and methodologies. For example, vehicle-mounted tires may be equipped with strain sensors that detect and measure the deflection of each tire from tire loading. By measuring tire deflection, and thereby the vehicle's loading condition (full, half-full, empty), systems such as stability/brake/traction control systems may be adjusted as a function of the loading condition. Of particular importance is the determination of loading in off-road vehicles such as mining trucks that may operate under full or partial loaded conditions during normal operation. While measuring vehicle loading through evaluation of tire deformation is an effective technique, factors that affect tire deformation such as road condition, sensor dependability, and operating conditions (i.e. inflation pressure, temperature, aging) can make the accuracy of a tire-deflection determination problematic. It is accordingly desirable to be able to estimate a vehicle's load condition by indirect measurement of the vehicle loading condition, independently of any tire-mounted load sensor. A suitable indirect methodology and system would preferably use commonly available vehicle measured parameters in order to minimize the cost and complexity of load estimation system integration.

SUMMARY OF THE INVENTION

According to an aspect of the invention a system and method estimating a vehicle tire load is disclosed that identifies a change in vehicle loading condition by measuring vibration resonant frequency peaks (bounce mode and/or pitch mode) of the sprung mass. Signals required include the chassis vertical acceleration and/or chassis pitch rate obtained from commercially available sensors mounted to the vehicle. An observer model receives the inertial signal(s) and generates a dynamic load estimation based upon observed frequency change in the sprung mass natural frequency.

DEFINITIONS

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"CAN bus" or "controller area network" is a vehicle bus standard designed to allow microcontrollers and devices to communicate with each other within a vehicle without a host computer. CAN bus is a message-based protocol, designed specifically for automotive applications.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Kalman Filter" is a set of mathematical equations that implement a predictor-corrector type estimator that is optimal in the sense that it minimizes the estimated error covariance when some presumed conditions are met.

"Lateral" means an axial direction.

"Lateral edges" means a line tangent to the axially outermost tread contact patch or footprint as measured under normal load and tire inflation, the lines being parallel to the equatorial centerplane.

"Luenberger Observer" is a state observer or estimation model. A "state observer" is a system that provide an estimate of the internal state of a given real system, from measurements of the input and output of the real system. It is typically computer-implemented, and provides the basis of many practical applications.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Slip Angle" is the angle between a vehicle's direction of ravel and the direction in which the front wheels are pointing. Slip angle is a measurement of the deviation between the plane of tire rotation and the direction of travel of a tire.

"Tread element" or "traction element" means a rib or a block element defined by having a shape adjacent grooves.

"Tread Arc Width" means the arc length of the tread as measured between the lateral edges of the tread.

"Vibration Spectral Analysis" is a methodology for analyzing a machine vibration spectrum using velocity, displacement, acceleration versus frequency.

BRIEF DESCRIPTION OF THE DRAWINGS

The invention will be described by way of example and with reference to the accompanying drawings in which:

FIG. 6A is a sprung mass (chassis) vibration response graph showing load sensitivity for chassis bounce frequency at 1.621 Hz.

FIG. 6B is a sprung mass (chassis) vibration response graph showing load sensitivity for chassis bounce frequency at 1.172 Hz.

FIG. 7C is a graph showing sprung mass acceleration amplitude over time and sprung mass motion frequency amplitude.

DETAILED DESCRIPTION OF THE INVENTION

Figure 2:
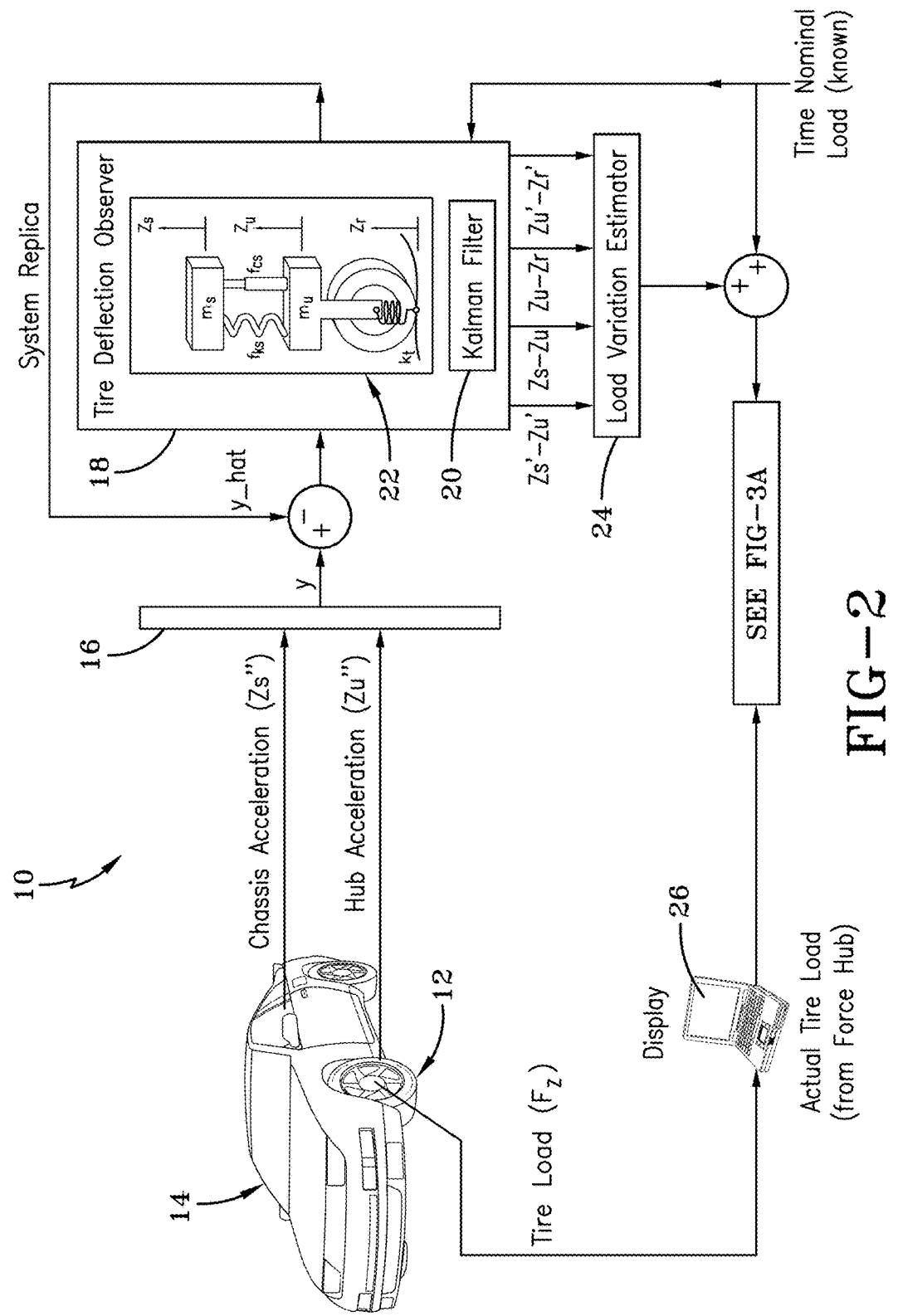
FIG. 2 is a schematic representation of a system using an actual tire load measuring sensor.
Figure 3A:
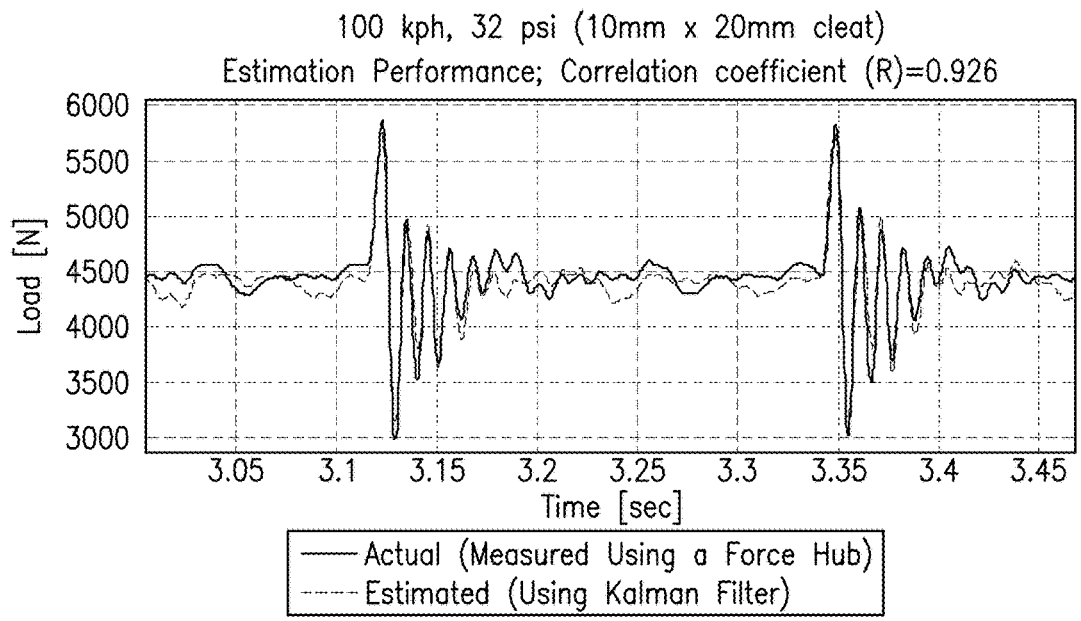
FIG. 3A is a graph of actual vs. estimated load estimation results at 100 kph speed at a tire inflation of 32 psi., using a correlation coefficient (R)=0.926.

Referring first to FIGS. 2 and 3A, a system and method 10 for estimating an instantaneous tire load is shown schematically by FIG. 2. A tire 12 supports a vehicle 14. Each of the tires 12 is equipped with a tire pressure monitoring device (TPMS) (not shown) of commercially available configuration affixed to a tire component such as a tire inner liner by suitable means such as adhesive. The TPMS device is equipped with an air pressure measuring sensor for measuring air pressure within a tire cavity as well as tire identification data. A transmitter for transmitting the measured pressure and tire ID data to a vehicle-based data processing receiver is included within the TPMS device. On vehicle sensors convey through CAN bus 16 sensor data from a hub accelerometer mounted to the wheel hub and a chassis mounted chassis accelerometer. The sensor data from the accelerometers are transmitted to a data processing unit that includes an observer 18, such as but not limited to a Kalman filter, that functions utilizing Kalman-filtering techniques. The Kalman linear filter 20 estimates the vertical deflection of the tire 12 by applying estimation techniques based on the "quarter car model" 22 shown in FIG. 2 in which:

$Z_s$=chassis vertical deflection as measured by accelerometer 22;

$Z_u$=Hub vertical deflection as measured by accelerometer 20;

$Z_r$=Wheel vertical deflection;

$K_{suspension}$=suspension stiffness;

$C_{suspension}$=suspension dampening coefficient;

$K_{tire}$=tire stiffness;

$C_{tire}$=tire dampening coefficient;

$M_s$=sprung mass;

$M_u$=unsprung mass.

The standard notational convention for describing a State-space representation is given by:

x'=A x+B u} state equations;

y=C x+D u} output equations;

where:

x(t) State vector;

x'(t) Derivative of state vector;

A State matrix;

B Input matrix;

u(t) Input vector;

y(t) output vector;

C output matrix;

D Direct transmission matrix

The equivalent state space representation of the "quarter car model" used in the Kalman filter has been specified below as.

$A=[((-C_{suspension}/M_s)-(C_{suspension}/M_u))\ ((-K_{suspension}/M_s)-(K_{suspension}/M_u))\ (K_{tire}/M_u)\ 0;$ 1 0 0 0;

0 0 0 1;

$C_{suspension}/M_u\ K_{suspension}/M_u\ -K_{tire}/M_u\ 0];$

B=[0 0 0 0];

$C=[-C_{suspension}/M_u\ -K_{suspension}/M_u\ 0\ 0;$ $C_{suspension}/M_u\ K_{tire}/M_u\ -K_{tire}/M_u\ 0];$

D=[0 0].

Estimated states of the Kalman linear filter 28 are ($Z_s'$−$Z_u'$), ($Z_s$−$Z_u$), ($Z_u$−$Z_r$) and ($Z_u'$−$Z_r'$). The state estimations are input into a load variation estimator 30 and utilized within the expression:

$$[Ktire*(Z_u-Z_r)+Ctire*(Z_u'-Z_r')] \quad (1)$$

The Kalman Filter 20, in performing its state estimation, further utilizes a tire nominal static load in conjunction with the tire stiffness information. The static load estimation is generated by tire attached sensors. The TPMS system produces tire identification and inflations data which is used to consult and extract tire stiffness $K_{tire}$ from a tire-specific database. The load variation from load variation estimator 24 is calculated by use of expression (1), fusing the tire deflection information with the tire load and stiffness information.

Figure 3B:
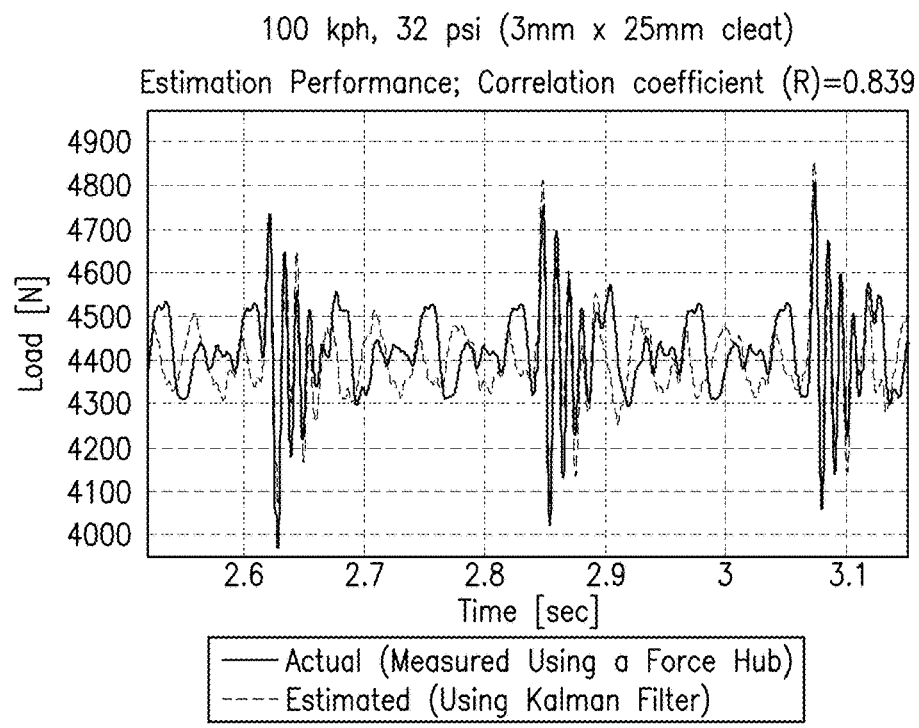
FIG. 3B is a graph of actual vs. estimated load estimation results at 100 kph speed at a tire inflation of 32 psi., using a correlation coefficient (R)=0.839.

In order to verify the accuracy of the instantaneous load estimation, actual loading on a tire 12 is measured in the FIG. 2 experimental physical system by a force hub and display 26. The estimated instantaneous load on tire 12 is compared against the actual loading on the tire and the comparison is indicated graphically by FIGS. 3A and 3B. The estimated load from FIG. 2 load variation estimator 24 is compared to the actual tire load Fz from the force hub. In FIG. 3A, the load (N) over time is graphed at a vehicle speed of 100 kph, and a tire inflation of 32 psi. It will be seen from FIG. 3A and FIG. 3B that the actual loading (measured by the force hub) and the estimated instantaneous load estimation made by the system and method 10 of FIG. 2 compare favorably and achieve an estimation correlation of (R)=0.926. In FIG. 3B, the estimation performance is graphed for a 3 mm×25 mm cleat, showing load vs. time for actual using a force hub and estimated using a Kalman filter.

Figure 1:
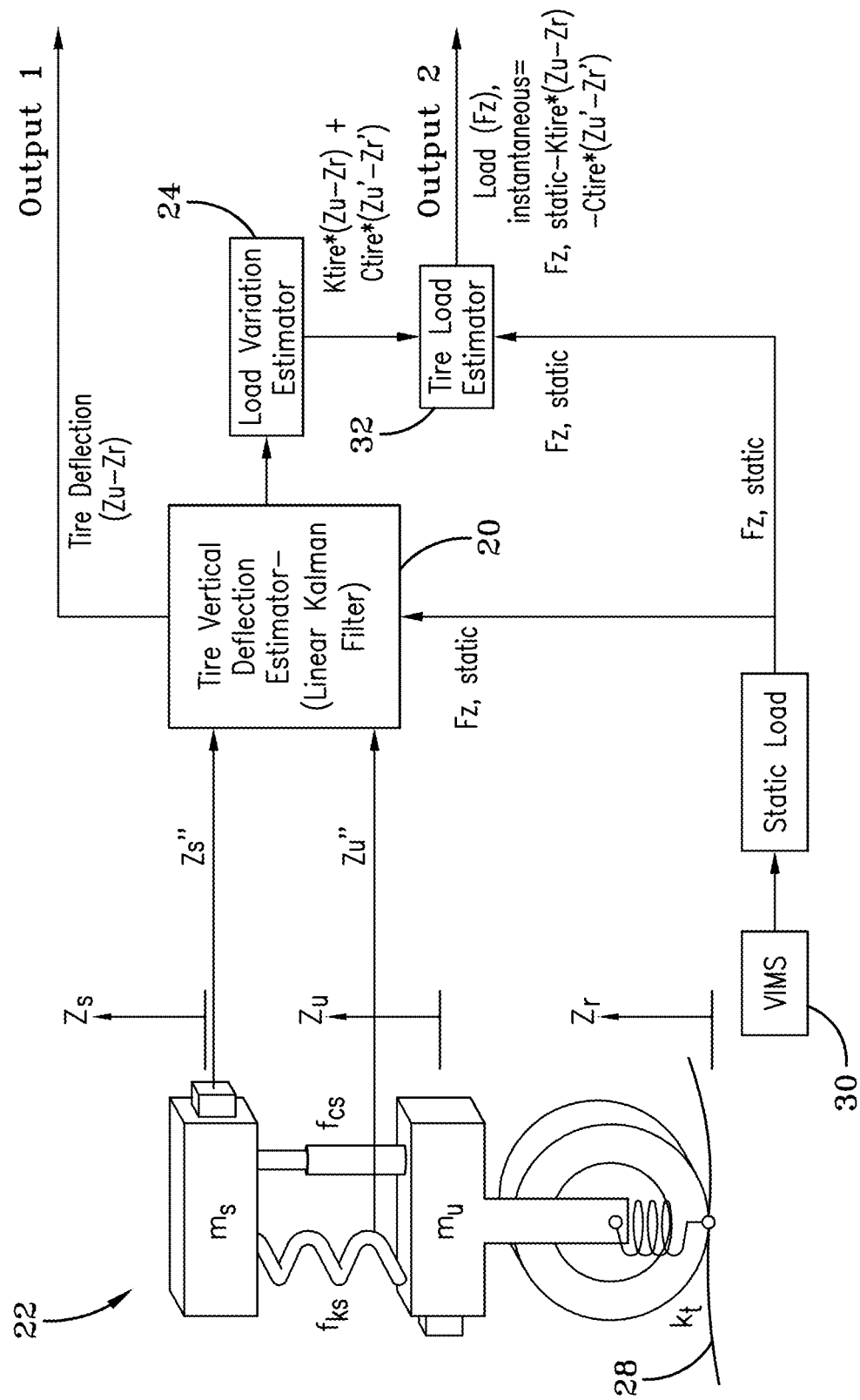
FIG. 1 is a schematic representation of the tire deflection and load estimation system.

The "quarter car model" 22 estimation scheme is shown in schematic detail by FIG. 1. In the estimation, the Kalman filter 20 analyzes suspension reaction of a quarter car model traversing a ground surface 28. Measuring the vertical deflection of the vehicle system to undulations present in the road surface 28, a chassis-mounted accelerometer measures chassis vertical acceleration Zs, while a hub-mounted accelerometer measures wheel hub vertical acceleration Zu. The acceleration parameters Zs" and Zu" input into the tire deflection estimator 20 (Linear Kalman Filter). Tire defection is estimated by the Kalman Filter 20 and a first output, representing the tire deflection, is expressed by (Zu−Zr). In the schematic representation of FIG. 1, static loading on the tire is indicated as being derived from a VIMS® System 30. "VIMS®" is a proprietary "Vital Information Management System" of Caterpillar Company that integrates monitors on off-road vehicles to provide critical information on a real-time basis. The system exports data to control processors that quantify haul road conditions. The purpose of the Caterpillar VIMS system is to optimize speed on grades in order to better manage payload and to provide check event logs for high brake temperatures, engine over-speeds, etc. The subject invention, as explained below, dispenses with the need for an ancillary system such as the Caterpillar VIMS system in supplying static loading data. The static load from the VIMS system of FIG. 1 is fed to a tire load estimator 32 which also receives the load variation estimation from equation (1) above. Using the status load information from tire attached sensors and the load variation estimated by the Kalman Filter 20, an instantaneous load estimate $F_{z\ instantaneous}$ is made by using equation (2) below.

$$F_{z,\ instantaneous}=F_{z,\ static}-Ktire*(Z_u-Z_r)-Ctire*(Z_u'-Z_r') \quad (2)$$

Static loading on the tire 12 may alternatively be estimated by conducting a tire deformation analysis such as that described in U.S. Pat. No. 8,661,885, issued Mar. 4, 2014, entitled "TIRE SIDEWALL LOAD ESTIMATION SYSTEM AND METHOD", incorporated herein in its entirety by reference. The static load Fz static from a tire-attached, deformation-measuring, sensor is then available for use by the Kalman filter 20 as described previously. The physical system of FIG. 1 displays load estimation results that compare favorably with the FIG. 2 actual load force hub measurements.

As a result, the tire vertical deflection, reconstructed using the quarter car model, is sufficiently accurate for the purpose of providing an instantaneous load estimation. The chassis and hub mounted accelerometers used in physical system of FIG. 2 allows for a successful implementation of the observer using Kalman filtering techniques, and results in an acceptable correlation between actual and estimated load values.

The systems shown in FIGS. 1 and 2 thus use Kalman filtering techniques to estimate the vertical deflection of a tire by starting with the measures of the vehicle suspension dynamics. The observer is based on a "quarter car model". From the static load input (either VIMS-generated or tire-sensor derived) and vehicle suspension dynamics, an instantaneous load on a tire may be calculated. Tire attached TPMS data (inflation pressure and tire identification) is used to determine tire stiffness by application of a tire-specific database. The tire stiffness is used with a sensor or VIMS load (static) estimate obtained from tire based sensors (as in U.S. Pat. No. 8,661,885, issued Mar. 4, 2014) and fused with the instantaneous load variation estimate (using the tire deflection information) to yield an instantaneous load estimation.

Figure 4:
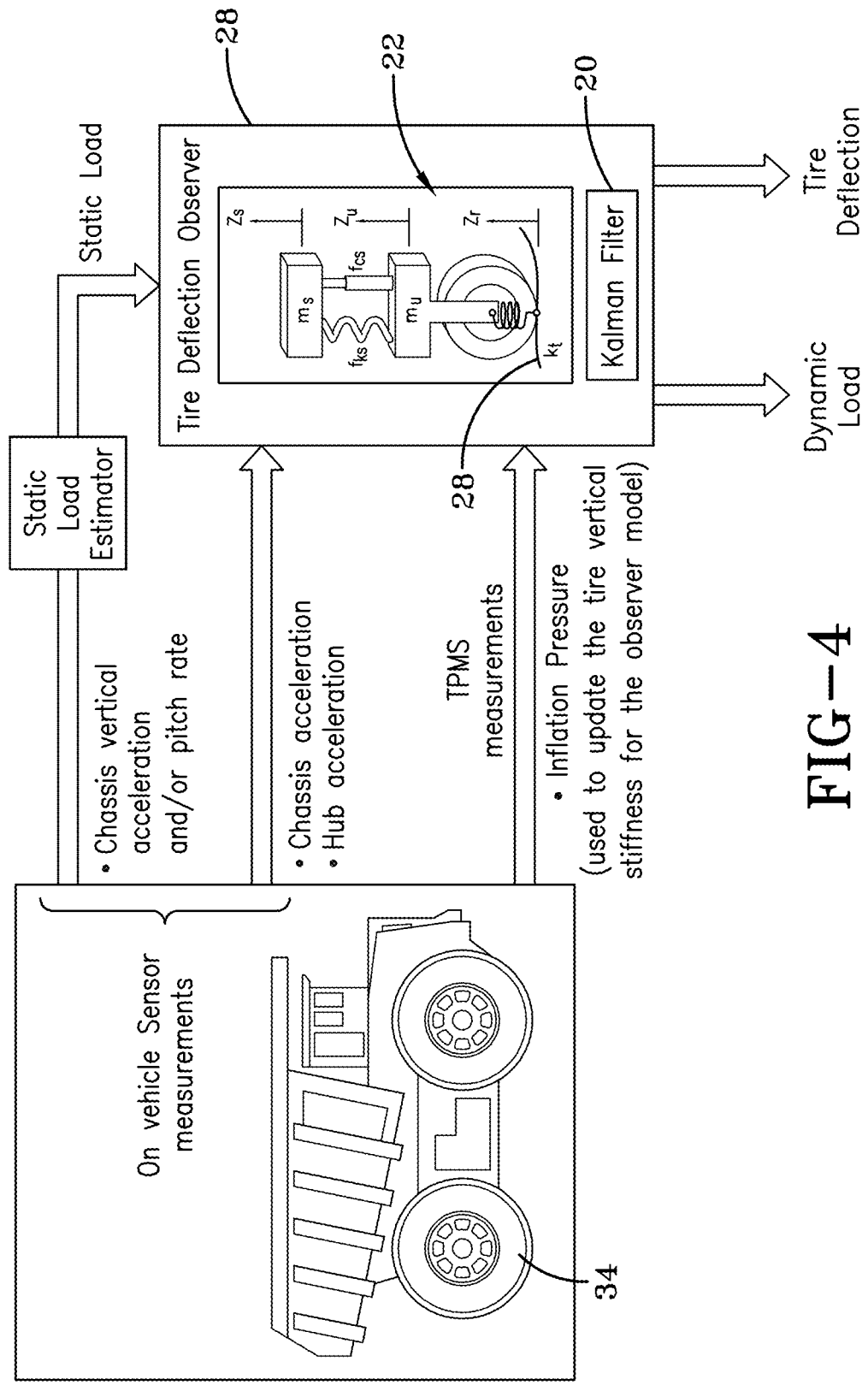
FIG. 4 is a schematic of a health monitoring system for off-road tires.

While the systems and methodologies manifest in FIGS. 1 and 2 work well, relying on tire-based sensors for static load input or the VIMS approach adds complicity to achievement of satisfactory load estimation. Consequently, the subject system and methodology as shown in FIG. 4 avoids the use of static load measurement in obtaining the loading state of a vehicle. A change in the vehicle 34 loading condition is detected by measuring vibration resonant frequency peaks (bounce mode and/or pitch mode) of the sprung mass. Signals required include the chassis vertical acceleration and/or chassis pitch rate; signals available from a standard 6-axis inertial measurement unit (IMU) commercially available in the market. For real time implementation, a short time Fourier transform approach is used. The on vehicle sensor measurements are input into the tire deflection observer 28 previously described to include a quarter vehicle model 22 and filter 20. Additional inputs are derived from tire-based TPMS sensors and include inflation pressure and tire identification from which tire vertical stiffness for the observer model may be determined.

Figure 5A:
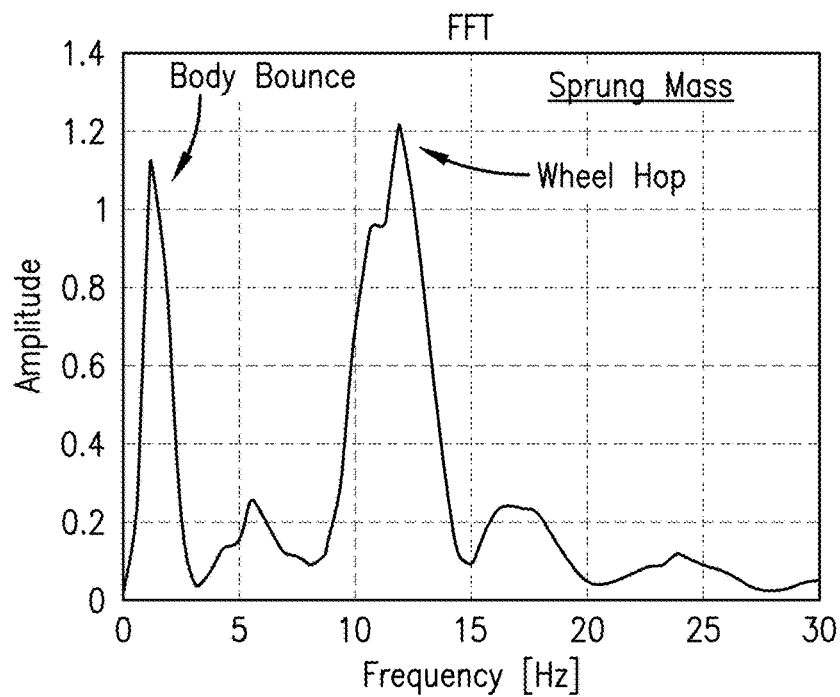
FIG. 5A is a sprung mass (chassis) vibration response graph showing body bounce and wheel hop peak amplitude vs. frequency.
Figure 5B:
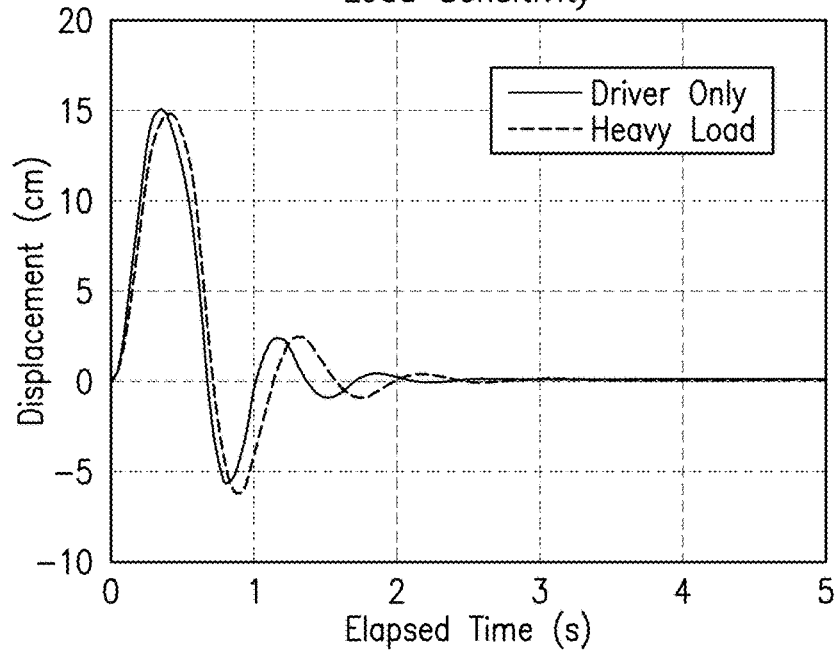
FIG. 5B is a sprung mass (chassis) vibration response graph showing load sensitivity.

FIG. 5A shows a sprung mass (chassis) vibration response curve wherein body bounce and wheel hop peaks are designated for a sprung mass. In FIG. 5B, the load sensitivity of a sprung mass (chassis) vibration response curve is shown for both driver-only loading a heavy load condition. Human factors considerations dictate that suspension components are selected so that any lightly damped motions are low in frequency. On the other hand, vehicle handling considerations demand finite component stiffness, restricting the range of natural frequencies observed in realistic passenger vehicles to a relatively tight band, typically on the order of 1.5 Hz (+/−½ Hz) for passenger sedans shown in FIG. 5A and 2 to 4 Hz for sports cars. Heavy truck suspension natural frequencies have a broader range, from 1 Hz to 2.5 Hz.

Increased load causes a measurable decrease in response frequency as shown in FIG. 5B. The presence of the load results in a delay of the "bounce" experienced by the car (i.e. the $2^{nd}$ peak in the response trace comes later for the loaded case). The frequency differential is measurable, distinguishable and greater than an amplitude difference. As seen, this peak frequency, typically 1 to 3 Hz is reduced when the vehicle mass is increased as shown in FIG. 5B. Thus a downward shift in the peak frequency response indicates the addition of load to the vehicle. For off-road vehicles such as trucks used in mining operations, the load variation can be anywhere between 100 to 150 percent, empty vs. full.

Figure 7A:
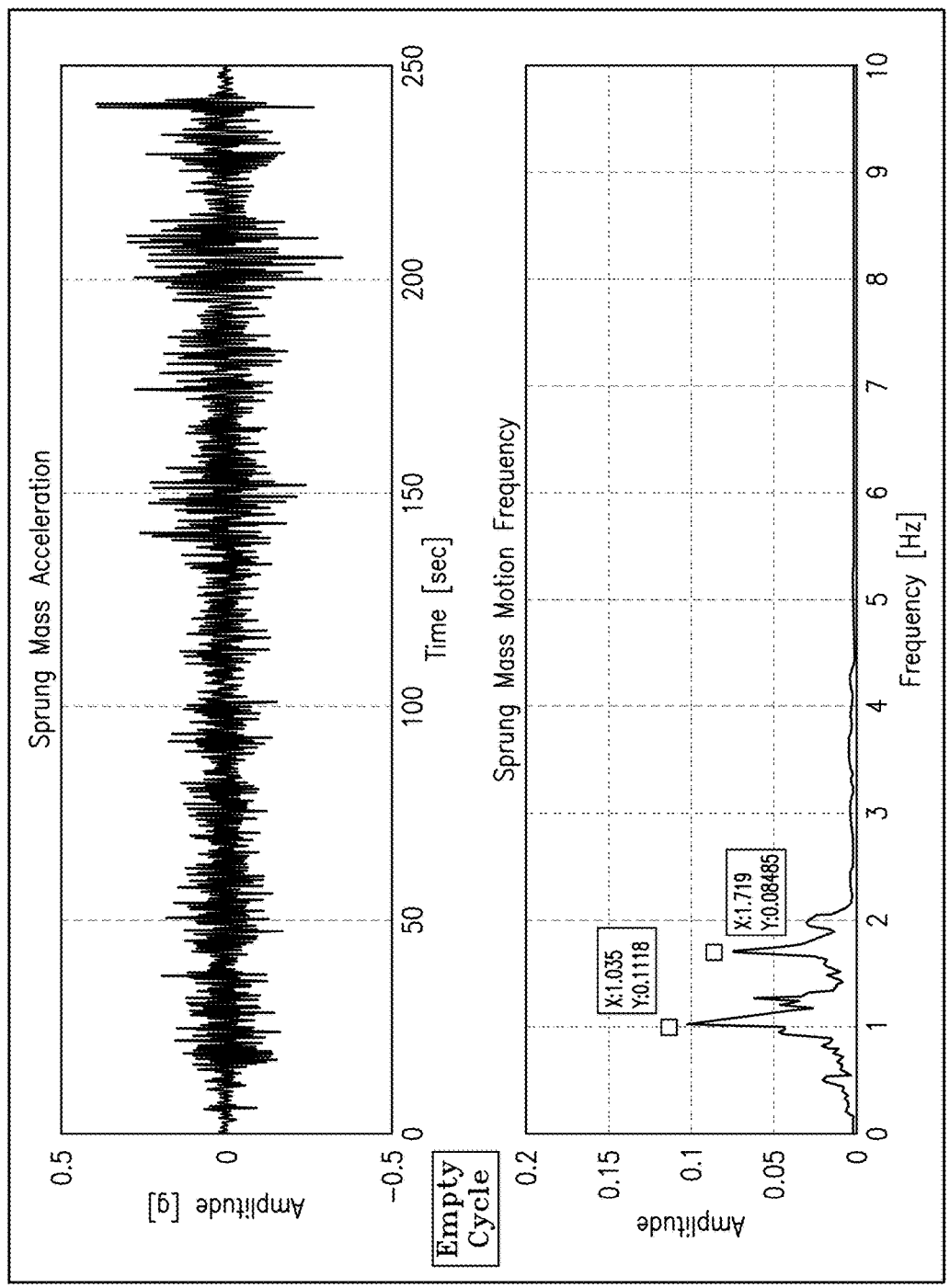
FIG. 7A is a graph showing sprung mass acceleration amplitude over time and sprung mass motion frequency.
Figure 7B:
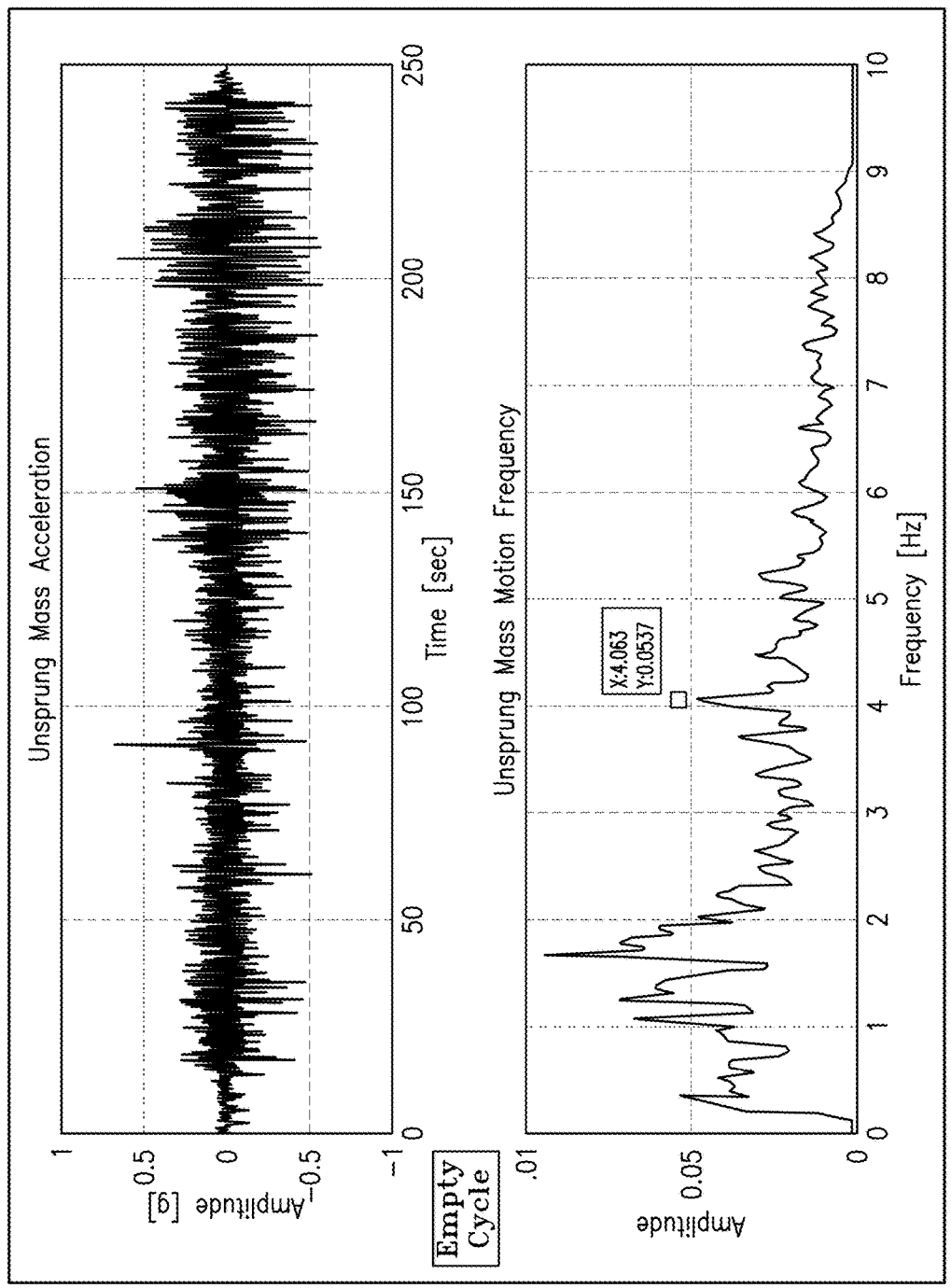
FIG. 7B is a graph showing unsprung mass acceleration amplitude over time and unsprung mass motion frequency amplitude vs. frequency spectrum.
Figure 7D:
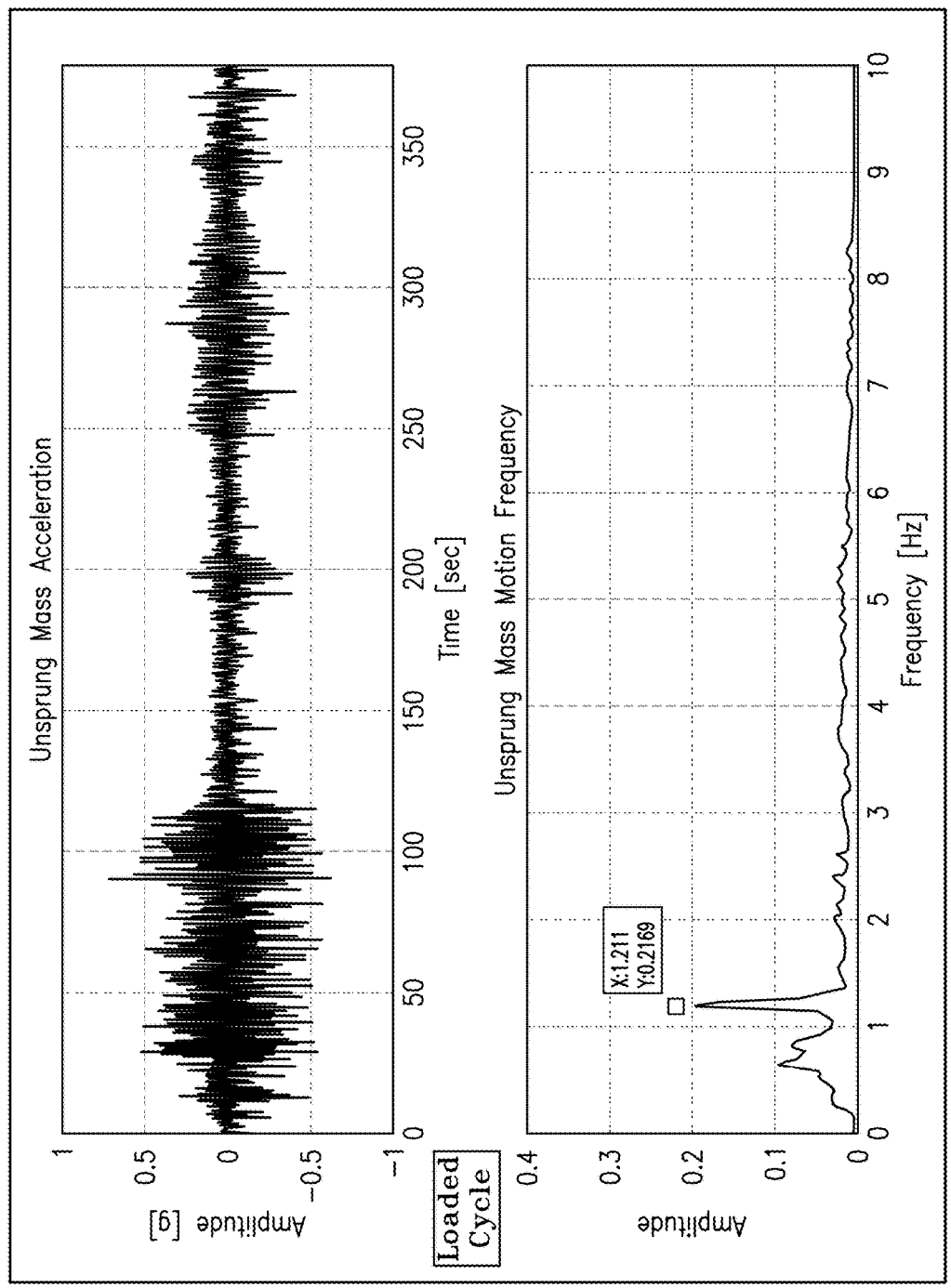
FIG. 7D is a graph showing unsprung mass acceleration unsprung mass motion frequency for a loaded cycle.

FIGS. 6A and 6B graphically show sprung mass (chassis) vibration response sensitivity and frequency dropping 28 percent from empty cycle of FIG. 6A to loaded cycle of FIG. 6B. The chassis bounce frequency in FIG. 6A is 1.621 Hz and 1.172 Hz in FIG. 6 B. More validation is shown in FIGS. 7A through 7D. FIG. 7A shows sprung mass acceleration and sprung mass motion frequency under empty load cycle. FIG. 7B shows unsprung mass acceleration and mass motion frequency in the empty load cycle. FIGS. 7C and 7D respectively show sprung mass acceleration and motion frequency and unsprung acceleration and mass motion frequency in the loaded cycle condition.

Figure 8A:
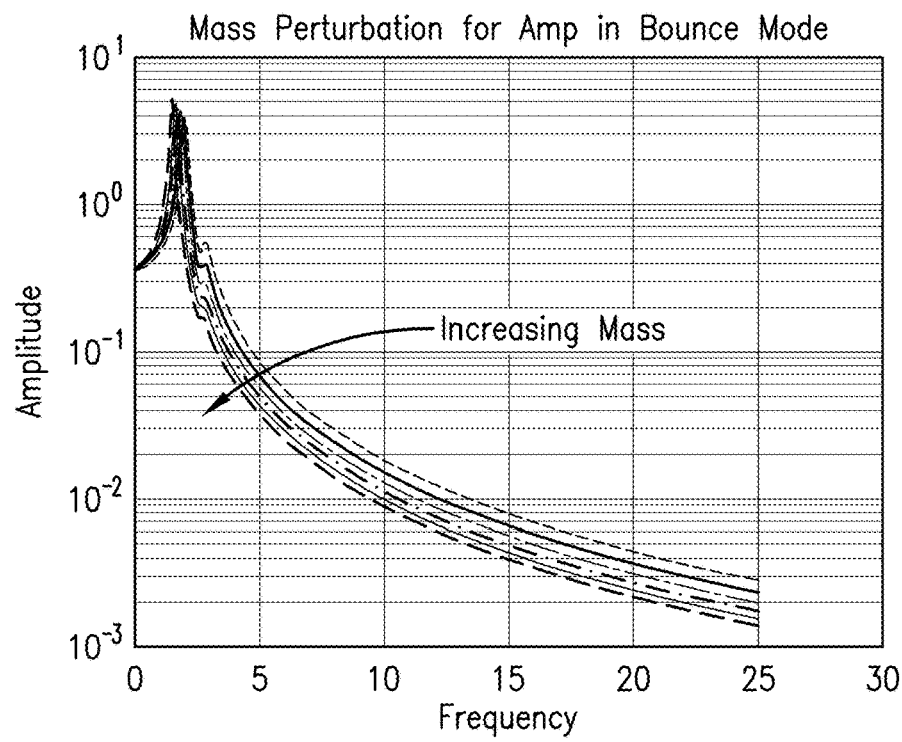
FIGS. 8A and 8B are respective graphs showing mass perturbation for amplitude in bounce and pitch modes.
Figure 8B:
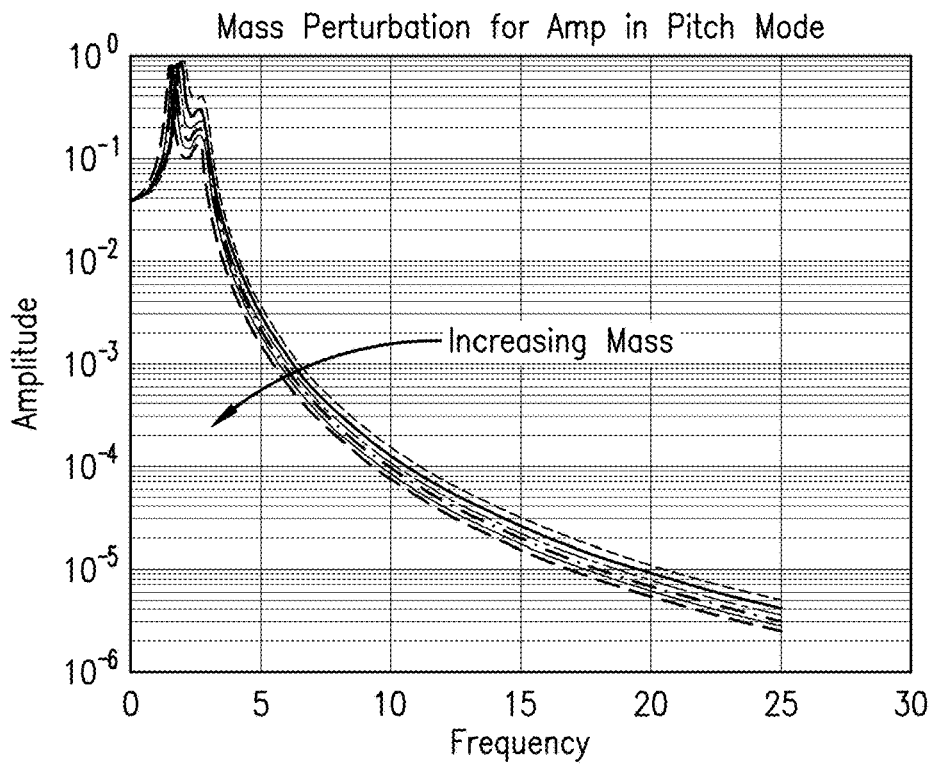
Figure 9A:
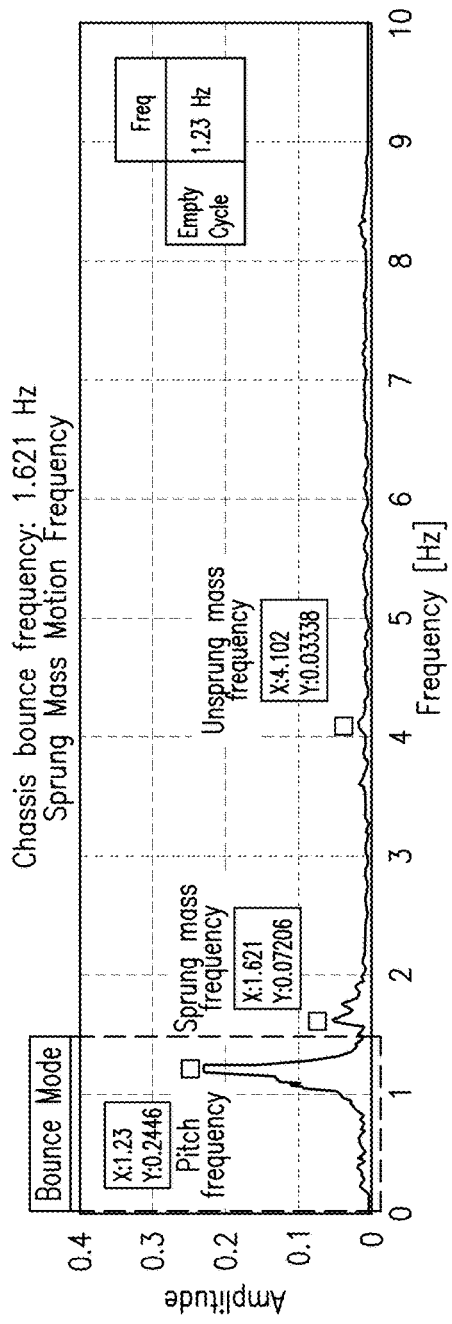
FIGS. 9A and 9B are graphs showing sprung mass motion frequency for chassis bounce frequencies of 1.621 and 1.172 Hz, respectively.
Figure 9B:
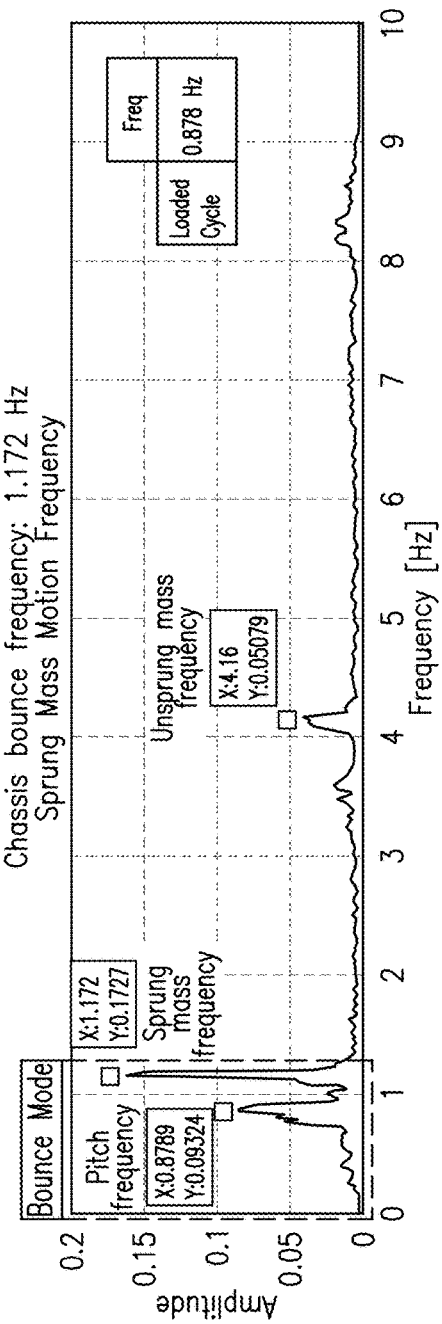

The effect of mass variation is further illustrated graphically by FIGS. 8A and 8B. Variation in mass is 50 to 100 percent of initial value. Mass perturbation for amplitude in bounce and pitch modes is shown. It should be noted that variations in the mass will also be realized by the moment of inertia since it is a function of mass as well as radius of gyration. Changes in pitch would accordingly be expected since a variation in inertial would have an effect on vehicle rotation in the vertical plane. Information about the vehicle pitch frequency may also be used to derive information about the vehicle loading state. Sprung mass (chassis) vibration response load sensitivity is shown further in FIGS. 9A (empty cycle) and 9B (loaded cycle). From FIGS. 9A and 9B, a peak frequency drop of 28 percent was empirically detected.

Figure 10A:
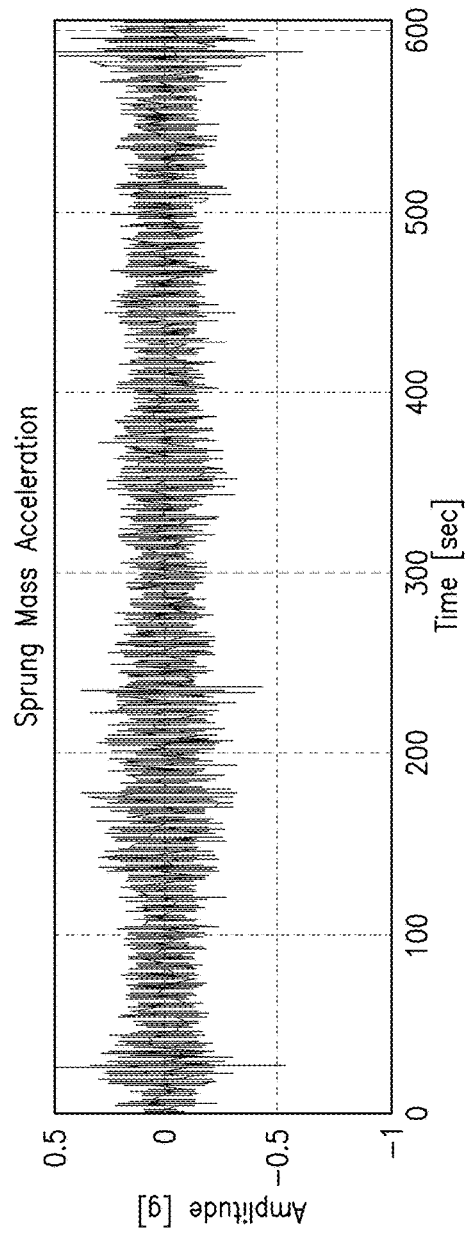
FIGS. 10A and 10B are real time implementation time-frequency graphs showing the use of a short time Fourier transform (STFT) function implementation.
Figure 10B:
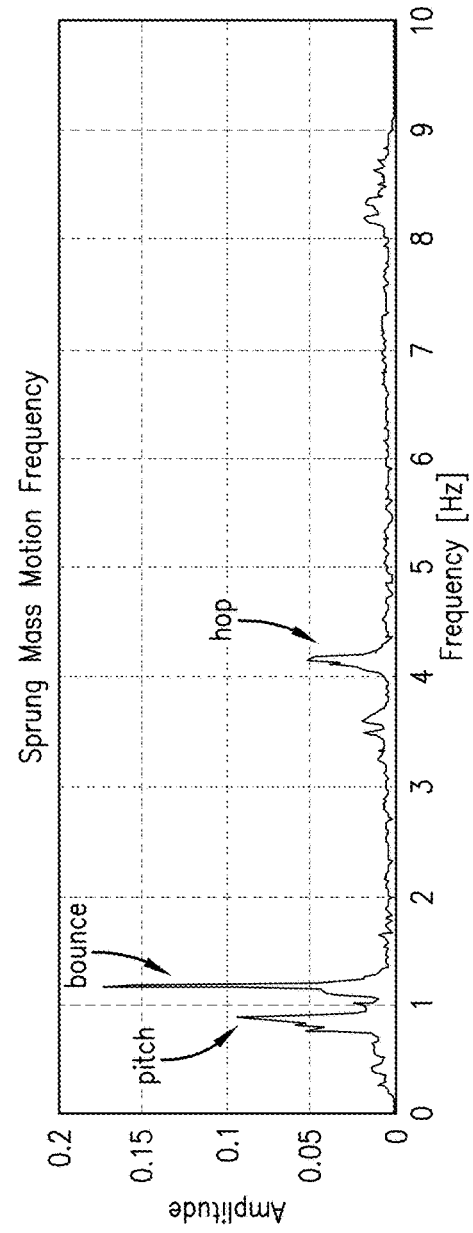
Figure 11:
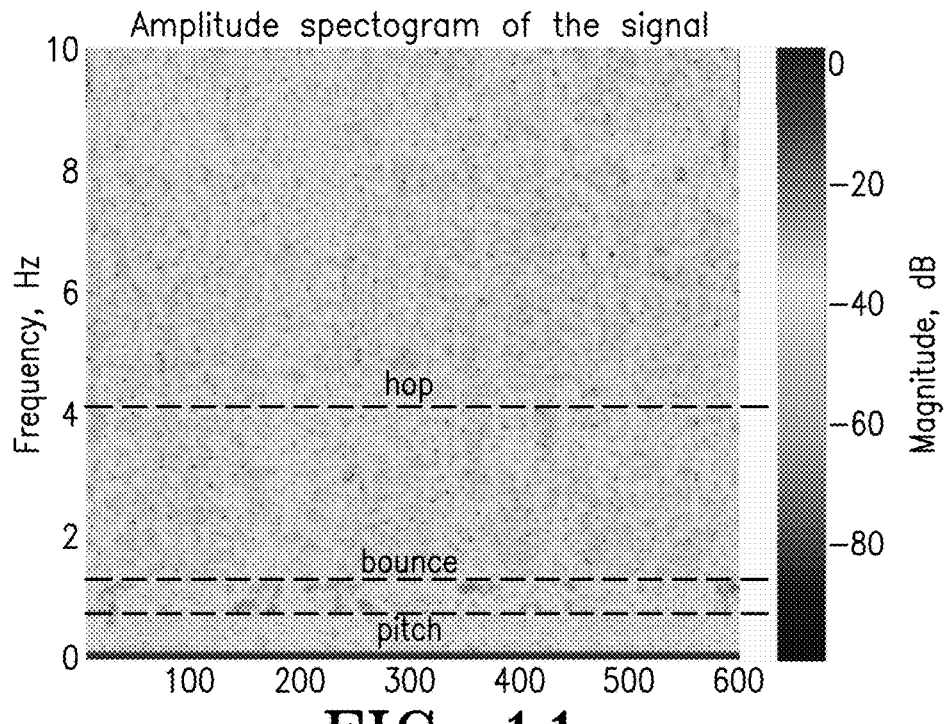
FIG. 11 is an amplitude spectogram of the signal.
Figure 12:
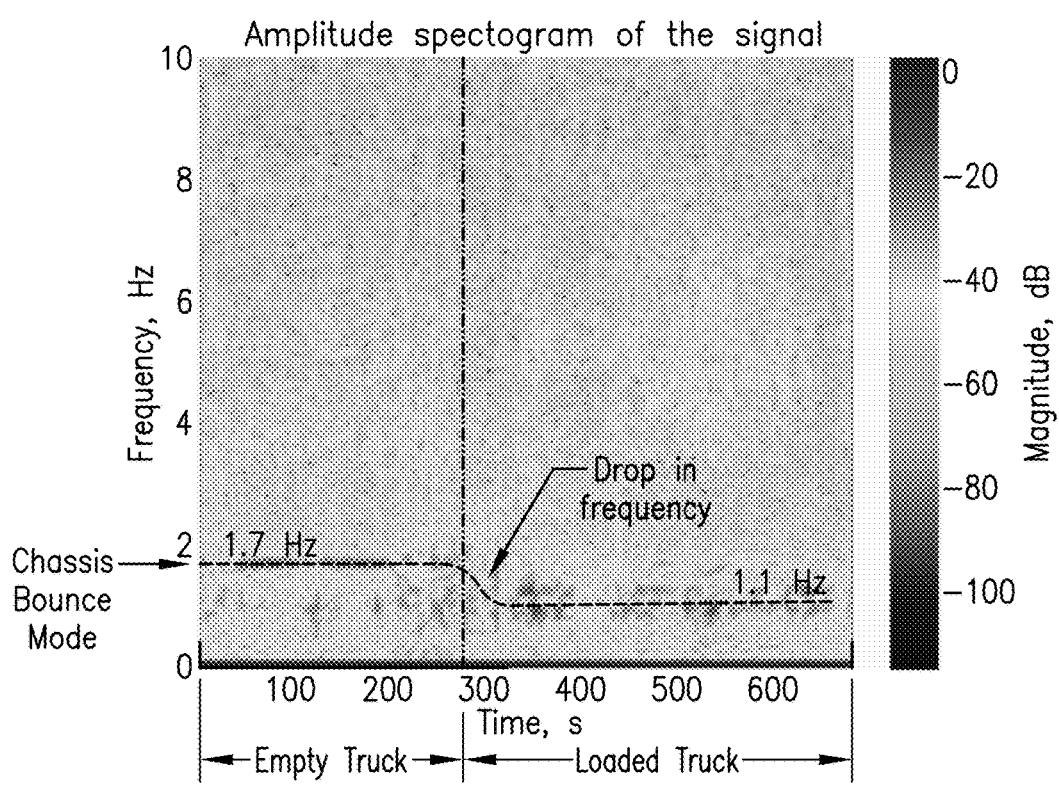
FIG. 12 is a time-frequency analysis of a combined cycle of an empty truck vs. a loaded truck demonstrating the detection of a drop in frequency.

For real time implementation, a short time Fourier transform (STFT) function is recommended. The STFT operates on a small section of the data. After the transform is complete on one section of the data, the next selection is transformed, and the output "stacked" next to the previous transform output. In FIG. 10A sprung mass acceleration amplitude over time is shown. In FIG. 10B sprung mass motion frequency is shown identifying pitch, bounce, and hop peaks. FIGS. 11 and 12 show the amplitude spectrogram of the signal is shown as frequency over time. It will be appreciated from a comparison of FIGS. 10A, 10B, to FIGS. 11 and 12, that STFT time and frequency information simultaneously may be used for real time event detection algorithms.

Figure 13:
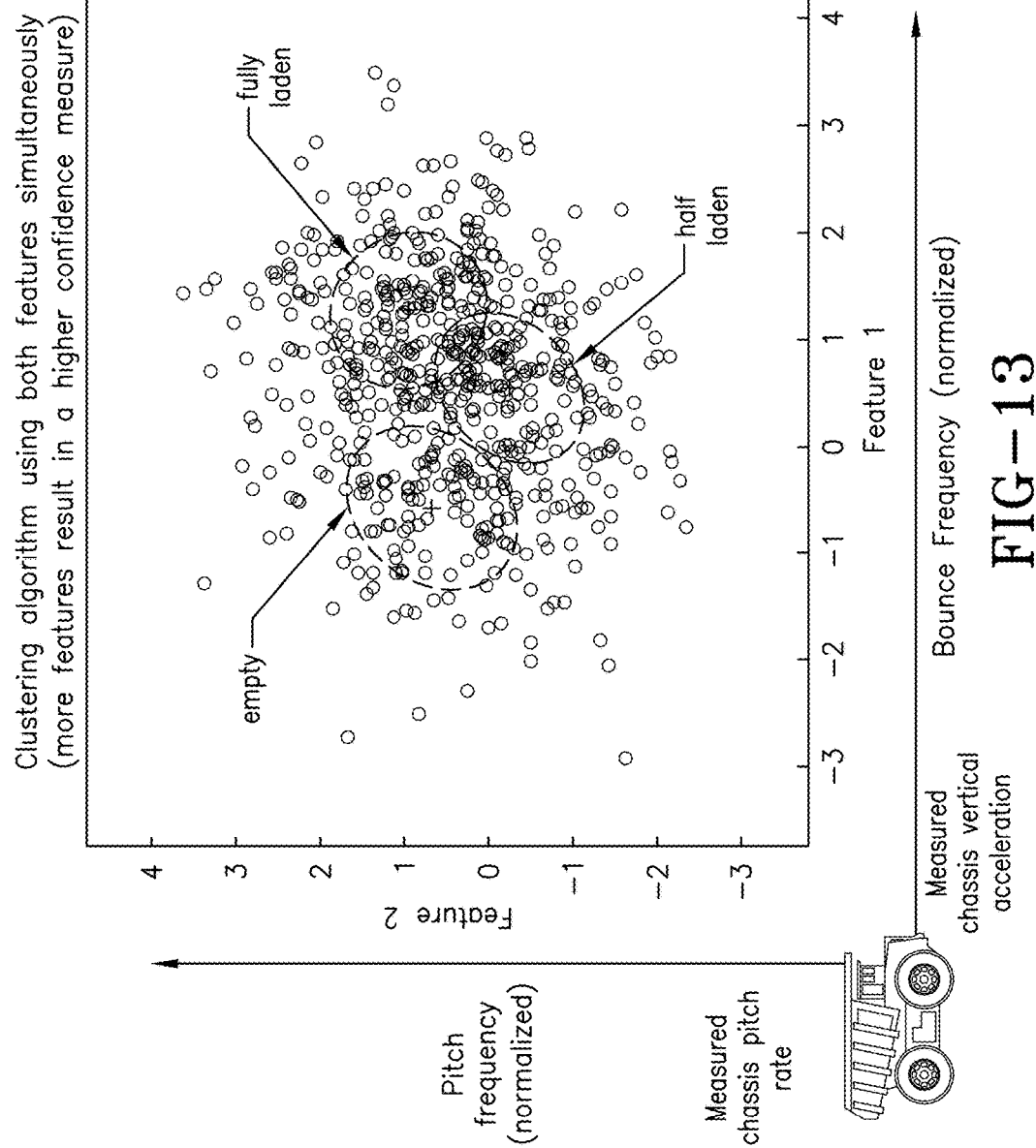
FIG. 13 is a graph showing a clustering algorithm using both features of measured chassis pitch rate and measured chassis vertical acceleration simultaneously.

From the empirical test results, it will be appreciated that it is possible to detect a change in the loading condition on a vehicle by measuring vibration resonant frequency peaks in the bounce mode and/or pitch mode of the sprung mass. A drop in frequency denotes a movement in vehicle loading between empty and fully loaded conditions. In FIG. 13, a clustering algorithm output is graphically shown using both features simultaneously. The more features (such as pitch frequency and bounce frequency) used results in a higher confidence measure. As seen in FIG. 13, empty, half-loaded, and fully laden conditions are clearly delineated and an estimation of such conditions may be made from measured chassis pitch rate and/or measured chassis vertical acceleration.

From the foregoing description of the subject load estimation system and method, it will be noted that the need for a measurement of static load (whether from a tire-based strain sensor or the VIMS system) is eliminated. The system and method may be extended to any automobile or truck type. Stability/brake/traction control system settings may be adjusted as a function of the loading conditions. Since the signals required are typically available on the vehicle CAN network for cars and trucks, no additional hardware cost would be involved from the implementation of the subject estimation system and method.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire load estimation method for a vehicle, the method comprising the steps of:
  providing a tire carried by a hub and supporting a vehicle chassis, wherein the vehicle chassis generates a vibration resonant frequency;
  mounting a hub-acceleration sensor to the vehicle;
  determining a hub acceleration using the hub-acceleration sensor;
  providing an inertial measurement unit mounted to the chassis;
  measuring at least one of a chassis vertical acceleration signal and a chassis pitch rate signal with the inertial measurement unit;
  electronically communicating the at least one of a chassis vertical acceleration signal and a chassis pitch rate signal to a processor;
  providing a static load estimator on the processor;
  receiving the at least one of a chassis vertical acceleration signal and a chassis pitch rate signal in the static load estimator and generating an estimated static load;
  mounting a pressure sensor to the tire;
  measuring an inflation pressure of the tire with the pressure sensor;
  electronically communicating the inflation pressure of the tire to the processor;
  providing a tire vertical stiffness generator on the processor;
  receiving the inflation pressure of the tire in the tire vertical stiffness generator and determining a tire-specific tire vertical stiffness;
  providing a tire deflection observer on the processor;
  receiving the estimated static load, a chassis vertical acceleration, a hub acceleration and the tire vertical stiffness in the tire deflection observer and calculating a dynamic load;
  outputting the calculated dynamic load to at least one of a stability control system, a brake control system and a traction control system in electronic communication with the processor; and adjusting at least one of the stability control system, brake control system and traction control system as a function of the calculated dynamic load.

2. The tire load estimation method according to claim 1, further comprising the step of mounting a tire-identification device to the tire to make a tire-specific identification.

3. The tire load estimation method according to claim 2, wherein the step of providing a tire vertical stiffness generator includes providing an accessible tire-specific stiffness database adjusted for the tire inflation pressure based upon the tire-specific identification of a given tire.

4. The tire load estimation method according to claim 1, wherein the step of providing a tire deflection observer includes a load variation estimator.

5. The tire load estimation method according to claim 1, further comprising the step of estimating a dynamic load on the tire from an observed change in frequency peaks within the vibration resonant frequency of the at least one of a chassis vertical acceleration signal and a chassis pitch rate signal.

6. The tire load estimation method according to claim 1, wherein the step of providing an inertial measurement unit includes providing a six-axis inertial measurement device.

7. The tire load estimation method according to claim 1, wherein the step of providing a tire deflection observer includes providing a Kalman filter model.

* * * * *